(12) United States Patent
Bernstein et al.

(10) Patent No.: US 10,536,667 B2
(45) Date of Patent: Jan. 14, 2020

(54) TECHNIQUES FOR DETECTING THE LOCATION OF A CABLE MODEM USING RADIO FREQUENCY CHANNEL SIGNATURE AND POWER LEVEL

(71) Applicant: CISCO TECHNOLOGY, INC., San Jose, CA (US)

(72) Inventors: Alon Shlomo Bernstein, Monte Sereno, CA (US); Hang Jin, Plano, TX (US)

(73) Assignee: Cisco Technology, Inc., San Jose, CA (US)

( * ) Notice: Subject to any disclaimer, the term of this patent is extended or adjusted under 35 U.S.C. 154(b) by 82 days.

(21) Appl. No.: 15/626,100

(22) Filed: Jun. 17, 2017

(65) Prior Publication Data
US 2018/0367852 A1 Dec. 20, 2018

(51) Int. Cl.
*H04N 21/45* (2011.01)
*H04N 21/442* (2011.01)
*H04N 7/10* (2006.01)

(52) U.S. Cl.
CPC .......... *H04N 7/106* (2013.01); *H04N 21/442* (2013.01); *H04N 21/4524* (2013.01)

(58) Field of Classification Search
CPC ... H04N 21/4524; H04N 21/442; H04N 7/106
USPC ........ 725/14, 30, 109–110, 12, 25; 709/225; 713/176
See application file for complete search history.

(56) References Cited

U.S. PATENT DOCUMENTS

| | | | | |
|---|---|---|---|---|
| 2007/0245369 A1* | 10/2007 | Thompson | ......... | G07C 9/00103 725/30 |
| 2007/0294739 A1* | 12/2007 | Walston | ................ | H04N 7/163 725/117 |
| 2008/0126540 A1* | 5/2008 | Zeng | ................... | H04L 12/2801 709/225 |
| 2010/0131971 A1* | 5/2010 | Hegglin | ............. | H04L 41/5022 725/25 |
| 2011/0197071 A1* | 8/2011 | Wolcott | ........... | H04L 25/03019 713/176 |
| 2016/0105703 A1 | 4/2016 | Bacon | | |
| 2017/0054615 A1 | 2/2017 | Wilson | | |
| 2017/0127154 A1 | 5/2017 | Thattannangalann | | |
| 2017/0141845 A1 | 5/2017 | Totten et al. | | |
| 2017/0164267 A1 | 6/2017 | Marka | | |

* cited by examiner

*Primary Examiner* — Brian T Pendleton
*Assistant Examiner* — Alan H Luong
(74) *Attorney, Agent, or Firm* — Merchant & Gould P.C.

(57) ABSTRACT

An embodiment of a method includes determining a channel signature for each of a plurality of cable devices associated with a selected household; determining whether at least one of the channel signatures is substantially different than the remaining ones of the channel signatures; and if at least one of the channel signatures is substantially different than the remaining ones of the channel signatures, flagging the selected household for potential theft of services review. Additional embodiments may include determining a radio frequency ("RF") signal power level for each of the cable devices; calculating a sum of the determined RF signal power levels; determining whether the calculated sum is equal to an RF power signal level measured at a tap of the selected household; and if the calculated sum is not equal to the measured RF power signal level, flagging the selected household for potential theft of services review.

19 Claims, 8 Drawing Sheets

TECHNIQUES FOR DETECTING THE LOCATION OF A CABLE MODEM USING RADIO FREQUENCY CHANNEL SIGNATURE AND POWER LEVEL

TECHNICAL FIELD

This disclosure relates in general to the field of cable communications networks and, more particularly, to techniques for detecting the location of a cable modem ("CM")/ set top box ("STB") using radio frequency ("RF") channel signature and power level in such networks.

BACKGROUND

In the context of cable networks, theft of service occurs when a first user subscribes to and purchases cable network services with multiple set top boxes ("STBs") and/or cable modems ("CMs") for a single household and then distributes the STBs/CMs to multiple households without securing and paying for separate subscriptions for the additional households. If the location of STBs/CMs could be detected with the resolution of households, once STBs/CMs belonging to a single subscription are detected in different households, theft of service fraud could be prevented.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

Figure 1:
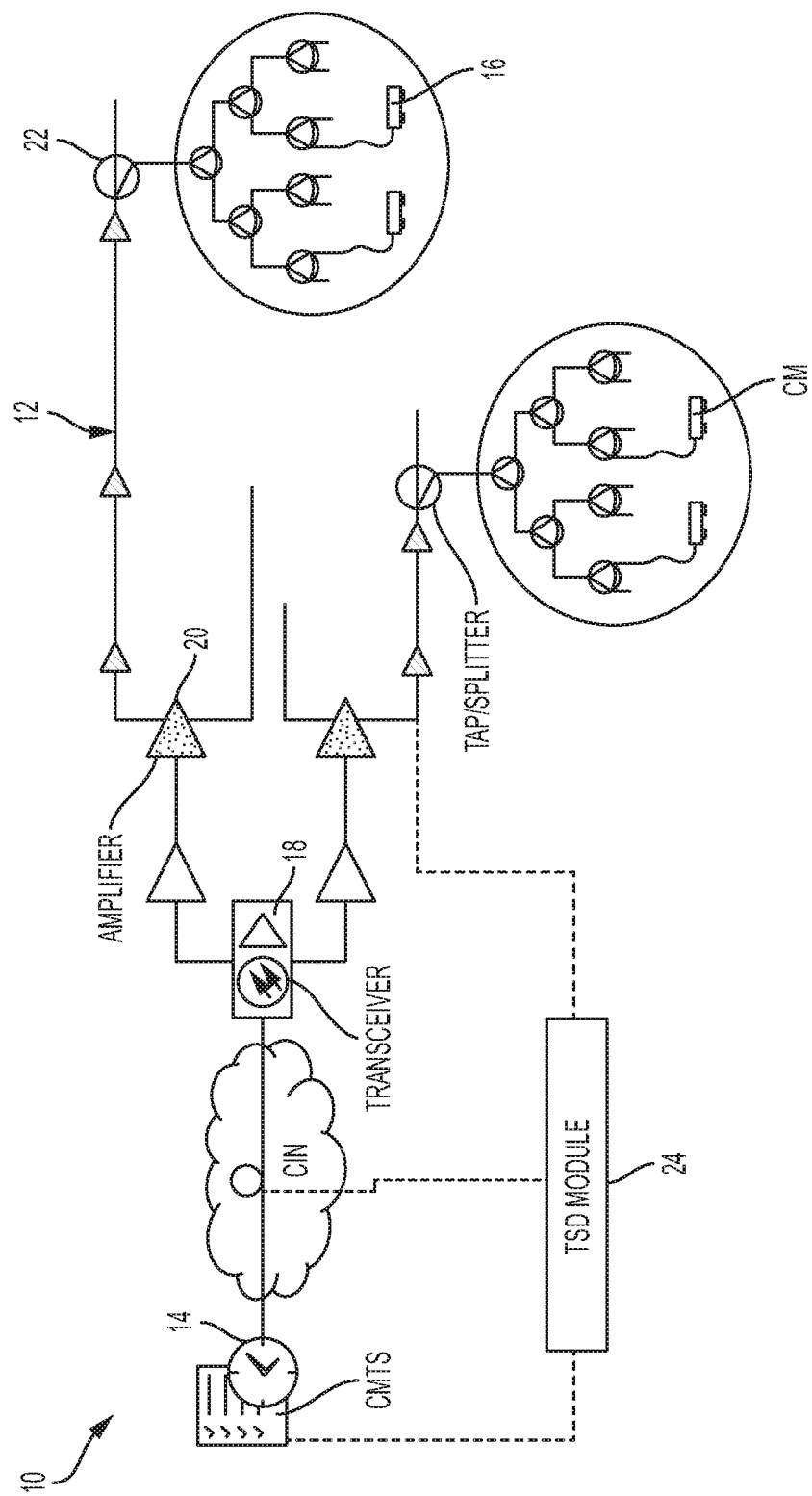
FIG. 1 is a simplified block diagram illustrating a communication system supporting a network architecture for detecting the location of a CM/STB using RF channel signature and power level in cable network environments.

An embodiment of a method includes determining a channel signature for each of a plurality of cable devices associated with a selected household; determining whether at least one of the channel signatures is substantially different than the remaining ones of the channel signatures; and if at least one of the channel signatures is substantially different than the remaining ones of the channel signatures, flagging the selected household for potential theft of services review. Additional embodiments may include determining a radio frequency ("RF") signal power level for each of the cable devices; calculating a sum of the determined RF signal power levels; determining whether the calculated sum is equal to an RF power signal level measured at a tap of the selected household; and if the calculated sum is not equal to the measured RF power signal level, flagging the selected household for potential theft of services review.

Example Embodiments

A cable television services system (or "CATV") is a system of delivering television programming to subscribers via radio frequency ("RF") signals transmitted through coaxial cables (or "coax"), or, more recently, via light pulses through fiber-optic cables. In contrast, in a broadcast television system, the television signal is transited over the air by radio waves and is received by an antenna attached to the television. FM radio programming, high-speed internet, telephone, and other non-television services may also be provided via CATV technology.

Cable distribution lines over local utility poles or underground utility lines deliver cable services to various locations. The cable signal is brought into a subscriber's home or business via an overhead or underground "service drop." The cable company's portion of the wiring usually ends at a distribution box on the exterior of the subscribers building and cable wiring built in to the building distributes the signal to jacks in different rooms to which televisions are connected. Multiple cables to different rooms are split off the incoming cable with a small device called a splitter. Most cable companies require a set-top box (or "STB") to view their cable television programming, even on newer televisions with digital cable QAM tuners, because most digital cable channels are now encrypted, or "scrambled." A cable from a wall jack may be attached to the input of the STB and an output cable from the STB is attached to an input of the television. Since the STB decodes only the channel being watched on the particular television, each television on the premises requires a separate STB. The cable company will provide STBs based on the level of service a customer purchases, from STBs with a standard definition picture connected through the standard coaxial connection on the television, to high-definition wireless DVR receivers connected via HDMI or component.

In most systems, multiple television channels are distributed to subscriber residences through coaxial cable that originates from a trunkline supported on utility poles that originate at the cable company's local distribution facility, or "headend." Many channels can be transmitted through a single coaxial cable using frequency division multiplexing ("FDM"). At the headend, each channel is translated to a different radio frequency which is assigned a different frequency slot on the cable, thereby preventing the separate television signals form interfering with one another. The main cable meets lines from the subscriber's residence in an outdoor cable box and either the subscriber's television or an STB provided by the cable company translates the desired channel back to its original ("baseband") frequency and it is displayed on the television screen. Due to widespread theft of services in previous analog systems, the television signals are typically encrypted in modern digital cable systems, and the STB must be activated using an activation code provided to the subscriber by the cable company before the STB will function.

There may also be "upstream" channels on the cable to send data from the STB to the cable headend for supporting advanced features such as requesting pay per view ("PPV") programs, cable Internet access, and cable telephone service. The "downstream" channels occupy a frequency range of approximately 50 MHz to 1 GHs, while the "upstream" channels occupy a frequency range of 5 MHz to 42 MHz.

Cable service providers may charge subscribers a one-time set-up fee and thereafter typically charge subscribers a monthly subscription fee which is often based on a level of service selected by the subscriber. For example, a "basic" package may include a minimum number of channels, while a "premium" package includes more channels, including, for example, movie and music channels. At the local headend, the signals from the individual television channels may be received by dish antennas from communication satellites. Additional local channels, such as local broadcast television stations, educational channels, and community access channels, are usually included in the cable service. Commercial advertisements for local businesses may be inserted into the programming at the headend.

Data over Cable Service Interface Specification ("DOCSIS") is an international telecommunications standard that enables implementation of high-speed data transfer over an existing cable TV ("CATV") network. DOCSIS may be employed by cable operators, also referred to as Multiple System Operators ("MSOs"), to provide Internet access over their existing hybrid fiber-coaxial ("HFC") infrastructure and may provide a variety of options available at Open Systems Interconnection ("OSI") layers 1 and 2, i.e., the physical layer and data link layer.

DOCSIS has enabled cable operators to widely deploy high-speed data services on CATV systems. Such data services allow subscriber-side devices, such as personal computers and the like, to communicate over an ordinary CATV network. A Cable Modem Termination System ("CMTS") connects the CATV network to a data network, such as the Internet. DOCSIS specifies that cable modems obtain upstream bandwidth according to a request/grant scheme. A cable modem sends a bandwidth allocation request to the CMTS when subscriber devices need to send traffic upstream into the cable network. The CMTS grants these requests using bandwidth allocation MAP messages. As with any system that serves consumers, optimizing speed, latency, processing time, synchronization, etc., presents a significant challenge to system designers, network architects, and engineers alike.

An HFC network will typically include a headend connected to a plurality of distribution hubs via a transport ring. Television channels are frequency division multiplexed onto a beam of light that travels through optical fiber trunk lines that fan out from the distribution hubs to a plurality of optical nodes disposed in local communities, for example. In certain embodiments, each of the optical nodes 20 can serve 500-2000 homes; however, that range is representative only and not intended to be limiting. At each of the optical nodes, the received light signal is translated into a RF electrical signal, which is distributed through coaxial cable to individual subscriber households. Trunk RF amplifiers and line RF amplifiers may be disposed along the coaxial cable to ensure that the amplitude of the RF signal remains sufficient throughout the system.

Turning to FIG. 1, FIG. 1 is a simplified block diagram illustrating a communication system 10 for detecting the location of a cable modem relative to a household using radio frequency channel signature and power level in accordance with one example embodiment. FIG. 1 illustrates a cable network 12 (indicated generally by an arrow) facilitating communication between a cable modem termination system ("CMTS") 14 and one or more DOCSIS terminal devices 16 such as cable modems ("CMs") and/or STBs. Note that in various embodiments, the terminal devices can comprise any one of modem terminal adapters, multimedia terminal adapters, voice-over-IP ("VoIP") terminal adapters, embedded cable modems of DOCSIS set-top gateways or like devices. Additionally, as used herein, the terms CM and STB may each be used to refer to one or more CMs and STBs collectively. Terminal devices 16 are connected to a headend (comprising one or more transceiver 18 and CMTS 14) of cable network 12 via nodes such as HFC radio frequency ("RF") amplifiers 20 and passive devices 22 including cabling, taps, splitters, and in-line equalizers. Cable network 12 includes various other components that are not shown in detail in the figure and facilitates communication of multi-tone signals between transceiver 18 and terminal devices 16.

In some embodiments, CMTS 14 is geographically remote from transceiver 18 and connected thereto across a Converged Interconnect Network ("CIN"), which comprises an IP network facilitating communication according to certain specific DOCSIS (and other) protocols. The headend connects to an IP (Internet Protocol) and/or PSTN (Public Switched Telephone Network) network. Data, such as TV programs, audio, video and other data is sent from the headend to the terminal devices. In addition, terminal devices 16 send data upstream towards the headend. Each of the nodes may be connected to multiple terminal devices. In various embodiments, the nodes connect to the headend, and the headend contains a plurality of CMTS units. Each CMTS contains a plurality of transceivers, which communicate with the plurality of terminal devices. For example, each CMTS may have eight or more receivers, and each receiver may communicate with hundreds of terminal devices.

In accordance with features of embodiments described herein, a theft of services detection ("TSD") module 24 is provisioned in one or more locations in communication system 10 to facilitate detection of potential theft of cable services provided via cable network 12. As will be described in detail below, TSD module 24 automatically identifies whether two cable modems are deployed within the same household using one or more of RF channel signature (e.g., pre-equalization coefficient) information and received signal power levels. On a technical level, TSD module 24 may be capable of managing tens of terabytes of historical network device operating information, while simultaneously providing real-time inquiry and access to the most recent information from network devices and customer premises equipment (CPE), such as cable modems and other terminal devices 16.

TSD module 24 may use pre-equalization coefficients may be used as a metric to determine whether two cable modems or STBs physically located in the same household in cable network 12. In one embodiment, the pre-equalization coefficient is used as the unique RF channel signature for a CM/STB. The TSD module 24 compares the signatures of two CMs/STBs assigned to the same household/subscriber to determine whether the CMs/STBs are physically located in the same household (in which case the respective channel signatures of the two devices will be similar if not identical) or if one of the CMs/STBs is located in (i.e., has been moved to) a different household (in which case the respective channel signatures of the devices will be very different), indicating a possible theft of services situation. Additionally, TSD module 24 may use received signal level power levels to determine whether two CMs/STBs are located in the same or a different household, as illustrated below.

In a general sense, HFC components, such as amplifiers, passive devices, and terminal devices, cause signal impairment in cable network 12 including return loss, isolation, mixing, and combining. For instance, reflections (including micro-reflections) may be caused by a length of cable connecting two devices with poor return loss, acting as signal reflectors. Any HFC component has the potential to reflect signals. Typical cable modems are configured for a design limit of 6 dB return loss whereas other components typically reflect a lower percentage of incident power.

To mitigate such signal losses, pre-equalization is generally implemented in cable network 12. For each channel of the signal (e.g., comprising data signals carried on a carrier of a particular frequency), an equalizer (comprising an electrical circuit) generates coefficients used in a digital equalizing filter that processes incoming signals with the coefficients for an inverse channel response, canceling distortions in the channel from the upstream channel impairments. In effect, the electrical circuit creates a digital filter that has approximately the opposite complex frequency response of the channel through which the signal is to be transmitted. DOCSIS 2.0 and DOCSIS 3.0 specify twenty-four symbol-spaced complex coefficients, also referred to as taps. The pre-equalization coefficients are used for amplitude and phase correction over a twenty-four symbol period time window.

Cable modems and other such terminal devices 16 typically implement pre-equalization to mitigate upstream channel impairments (e.g., for signals transmitted from CMs towards CMTS 14). The upstream pre-equalization mechanism relies on interactions of DOCSIS ranging processes for determining and adjusting the pre-equalization coefficients. In various systems, CMTS 14 computes the pre-equalization coefficients for each of terminal devices 16, and provide them to the respective ones of terminal devices 16. Appropriate digital filters at terminal devices 16 use their respective pre-equalization coefficients to pre-distort upstream signals to compensate for known (e.g., expected and/or pre-measured) upstream path distortions (e.g., linear impairments), so that as the pre-distorted upstream signal travels through cable network 12 it is corrected and arrives free of distortion at CMTS 14.

CMs and CMTSes may be polled to obtain pre-equalization coefficient data from all configured upstream channels. The gathered data is verified for format integrity and is normalized to be useful for comparison. For scalability purposes, the data collection process is conducted using a more frequent polling cycle for CMs that exhibited apparent distortion above a pre-determined level and a less frequent cycle for other CMs. The distortion is determined based on non-main tap to total energy ("NMTER") ratio. A detailed analysis is conducted including calibration and determination of distortion signatures from frequency domain and time domain analysis.

With pre-equalization coefficients, the approximate distance between two reflection points can be determined. Each one of the taps of the pre-equalization coefficients represents energy in the signal during a period of time. Taps of the pre-equalization coefficients that indicate more energy represent a reflection point. In other words, each of the taps relates to a time period based on the symbol rate of the channel. When a tap is elevated in power level amplitude, it indicates an impedance mismatch at that time period.

In an example embodiment, TSD module 24 uses pre-equalization coefficients as a primary metric, and signal power level as a secondary metric for determining a location of a CM/STB relative to another CM/STB. Taps in the pre-equalization coefficients are static and self-referred (e.g., use the main tap), and thus can be a good metric in terms of availability. Moreover, the pre-equalization coefficients may be suitably retrieved from various components of cable network 12 using existing mechanisms (e.g., from periodic polls of coefficient values and other relevant physical layer ("PHY") metrics).

Turning to the infrastructure of communication system 10, the network topology can include any number of cable modems, customer premises equipment, servers, switches (including distributed virtual switches), routers, amplifiers, taps, splitters, combiners and other nodes inter-connected to form a large and complex network. Network 12 represents a series of points or nodes of interconnected communication pathways for receiving and transmitting packets and/or frames of information that are delivered to communication system 10. Note that cable network 12 may also be referred to as a cable plant, and/or HFC network. A node may be any electronic device, computer, printer, hard disk drive, client, server, peer, service, application, or other object capable of sending, receiving, amplifying, splitting, or forwarding signals over communications channels in a network. Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs.

Cable network 12 offers a communicative interface between cable network components, and may include any appropriate architecture or system that facilitates communications in a network environment according to DOCSIS protocols and any other suitable communication protocol for transmitting and receiving data packets within communication system 10. The architecture of the present disclosure may include a configuration capable of DOCSIS, TCP/IP, TDMA, and/or other communications for the electronic transmission or reception of signals in the networks including cable network 12. The architecture of the present disclosure may also operate in conjunction with any suitable protocol, where appropriate and based on particular needs. In addition, gateways, routers, switches, and any other suitable nodes (physical or virtual) may be used to facilitate electronic communication between various nodes in the network.

In some embodiments, a communication link may represent any electronic link supporting a network environment such as, for example, cable, Ethernet, wireless technologies (e.g., IEEE 802.11x), ATM, fiber optics, etc. or any suitable combination thereof. In other embodiments, communication links may represent a remote connection through any appropriate medium (e.g., digital subscriber lines ("DSL"), coaxial fiber, telephone lines, T1 lines, T3 lines, wireless, satellite, fiber optics, cable, Ethernet, etc. or any combination thereof) and/or through any additional networks such as a wide area networks (e.g., the Internet).

Note that the numerical and letter designations assigned to the elements of the FIGUREs do not connote any type of hierarchy; the designations are arbitrary and have been used for purposes of teaching only. Such designations should not be construed in any way to limit their capabilities, functionalities, or applications in the potential environments that may benefit from the features of communication system 10.

It should be understood that communication system 10 shown in FIG. 1 is simplified for ease of illustration.

In particular embodiments, CMTS 14 may comprise a hardware appliance with appropriate ports, processors, memory elements, interfaces, and other electrical and electronic components that facilitate the functions described herein, including providing high speed data services, such as cable Internet or voice over Internet Protocol (e.g., in the form of digital, RF, or other suitable signals) to cable subscribers, such as cable modems 16. In various embodiments, CMTS 14 comprises a Universal Broadband Router ("uBR") with features that enable it to communicate with the HFC cable network via a suitable cable modem card, which provides an interface between the uBR protocol control information (PCI) bus and RF signals on the DOCSIS HFC cable network.

In some embodiments, CMTS 14 may comprise a converged cable access platform ("CCAP") core that transmits and receives digital signals in IP protocols, coupled with one or more physical interface ("PHY") transceiver(s), such as transceiver 18 that convert the digital IP signals into RF signals, and vice versa. The PHY transceivers, such as transceiver 18, may be co-located with the CCAP core at a common location, or may be located remote from the CCAP core and connected over a converged interconnect network ("CIN"). In some embodiments, CMTS 14 may comprise a single CCAP core and a plurality of PHY transceivers, such as transceiver 18. CMTS 14 is connected (e.g., communicatively coupled, for example, through wired communication channels) to terminal devices 16, transceiver 18, and other network elements in cable network 12.

Transceivers 18 may comprise suitable hardware components and interfaces for facilitating the operations described herein. In some embodiments, transceivers 18 may be embedded in or be part of another hardware component, such as a broadband processing engine comprising a motherboard, microprocessors and other hardware components. In some embodiments, transceivers 18 comprise downstream and upstream PHY modules, deployed in a Coaxial Media Converter ("CMC") that supports RF functions at the PHY layer. Transceivers 18 may comprise pluggable modules (e.g., small form-factor pluggable ("SFP")) that may be plugged into a network element chassis, or embedded modules that attach to cables directly. In addition to optical and electrical interfaces, transceivers 18 include a PHY chip, appropriate digital signal processors ("DSPs") and application specific integrated circuits ("ASICs") according to particular needs.

Amplifiers 20 comprise RF amplifiers suitable for use in cable network 12. Amplifiers 20 are typically used at intervals in network 12 to overcome cable attenuation and passive losses of electrical signals caused by various factors (e.g., splitting or tapping the coaxial cable). Amplifiers 20 may include trunk amplifiers, distribution amplifiers, line extenders, house amplifier and any other suitable type of amplifier used in cable networks.

In various embodiments, TSD module 24 comprises electrical circuits fabricated on integrated circuits (e.g., digital signal processors ("DSPs"), field programmable gate arrays ("FPGAs"), application specific integrated circuit ("ASICs")), printed circuit boards, or other suitable platforms with appropriate transistors, conductors, resistors and other electrical components for facilitating various operations as described herein. In some embodiments, TSD module 24 is incorporated into CMTS 14; in some other embodiments, TSD module 24 is incorporated into a computing device, such as a server connected to cable network 12; in yet other embodiments, TSD module 24 comprises a stand-alone dedicated device, for example, usable by a cable technician in the field.

Figure 2:
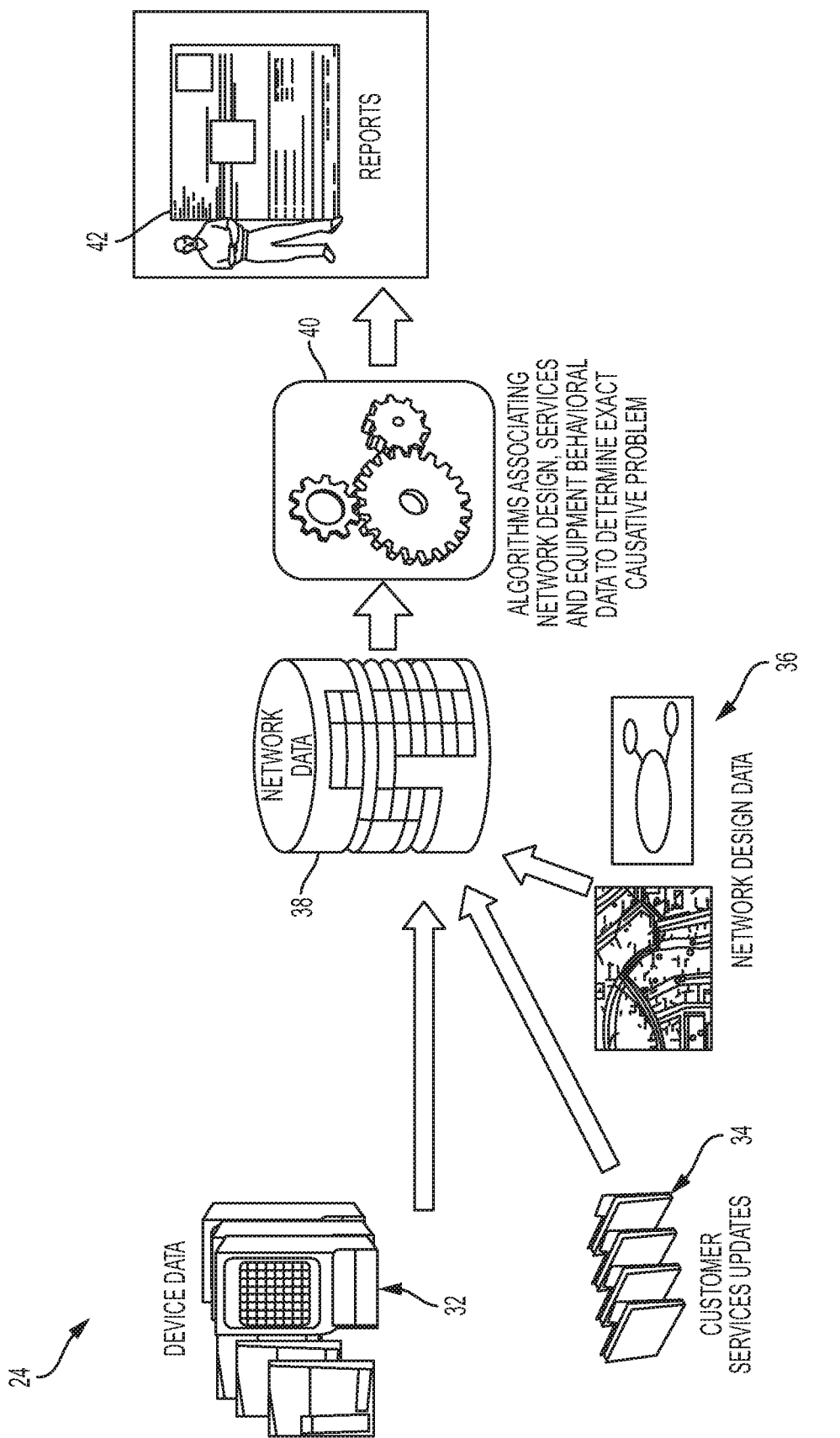
FIG. 2 is a simplified block diagram illustrating other example details of embodiments of the communication system.

Turning to FIG. 2, FIG. 2 is a simplified diagram illustrating example details of TSD module 24 according to an embodiment of communication system 10. Device data 32, customer services updates 34, network design data 36 (and other data not shown in the figure) may be collected and stored as network data 38. Device data 32 comprises device type, device characteristics, MAC address, and other information pertaining to the operation of the respective device in cable network 12. For example, device data 32 includes amplifier make, type, manufacturer number, specifications, etc. of a specific amplifier in cable network 12. Customer services updates 34 includes subscriber information, such as authorized network services, subscribed services, subscribed bandwidth, subscriber quality of service, and other information relevant to network services at individual customer sites in cable network 12. Network design data 36 comprises GIS data, associating devices in cable network 12 with specific geographic information.

TSD algorithms 40 execute on network data 38 to troubleshoot cable network 12 and detect possible theft of network services as described in detail herein. As used herein, the term "algorithm" refers to a self-contained process comprised of a set of conditional rules and step-by-step operations to be followed in problem-solving analysis. TSD algorithms 40 facilitate computations that, when executed, proceed through a finite number of well-defined successive deterministic (e.g., non-random) states, eventually producing an output and terminating at a final ending state. In other words, TSD algorithms 40 take as input network data 38 data, perform computations thereon, and produce one or more outputs that affect network diagnostics operations of cable network 12. In an example embodiment, TSD algorithms 40 comprise instructions executable by a processor and data associated therewith.

Reports 42 detailing possible theft detection information may be generated based on the results of execution of TSD algorithms 40. A key aspect of TSD module 24 is detecting pending network problems before they negatively affect customers. TSD module 24 provides a supportive platform intended to advise network operators and field technicians on possible theft of service in cable network 12 and potential resolutions thereto.

Figure 3:
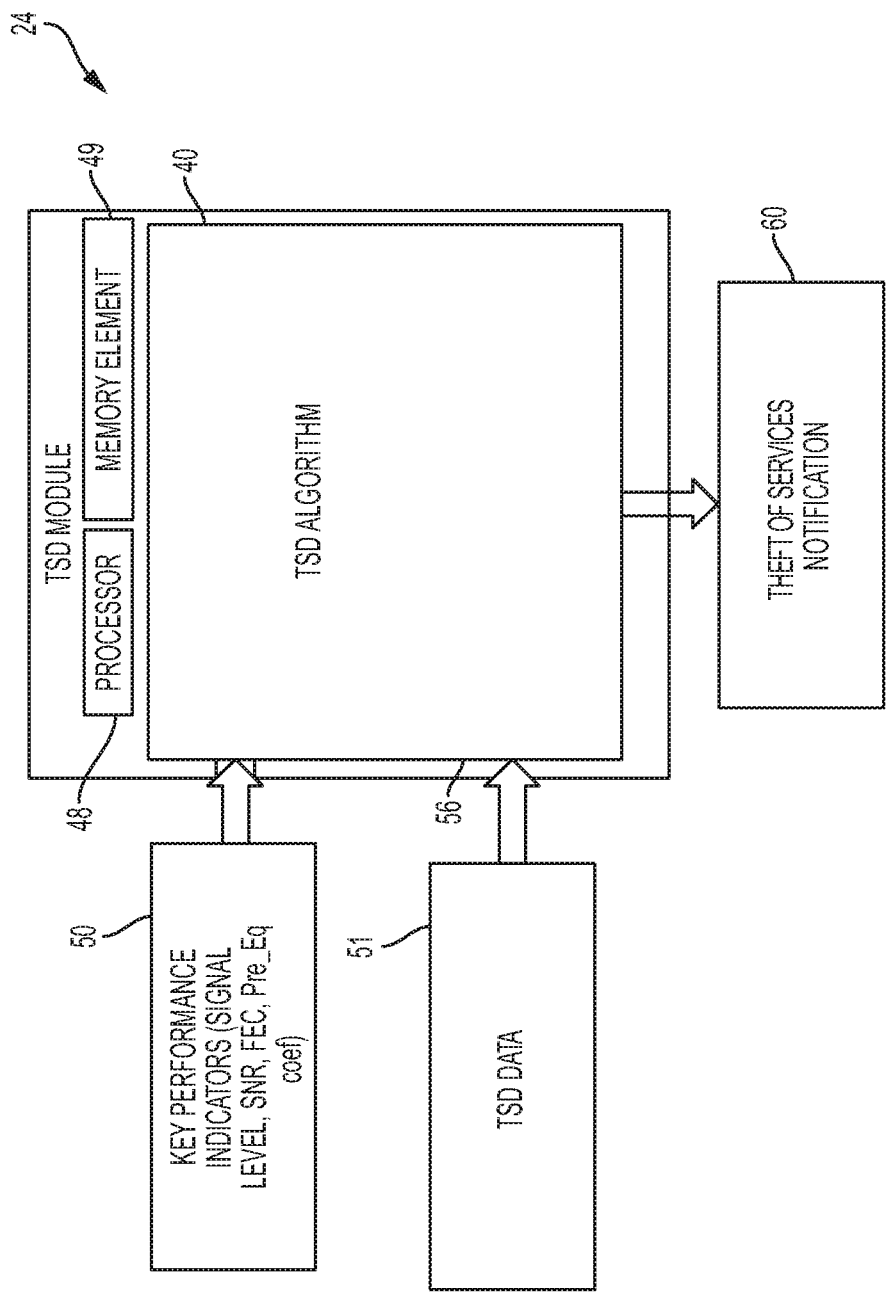
FIG. 3 is a simplified block diagram illustrating yet other example details of embodiments of the communication system.

Turning to FIG. 3, FIG. 3 is a simplified diagram illustrating example details of TSD module 24 according to an embodiment of communication system 10. A processor 48 and a memory element 49 for storing instructions and data associated with TSD algorithms 40 are included in TSD module 24. In various embodiments, processor 48 operates in conjunction with memory element 49 to execute TSD algorithms 40. In an example embodiment, TSD module 24 is fabricated on an integrated circuit, for example, an application specific integrated circuit (ASIC).

Network data 38 may include Key Performance Indicators ("KPI") 50, comprising signal levels, signal-to-noise-ratio ("SNR"), forward error correction ("FEC"), and pre-equalization coefficients and TSD data 51, comprising all other information relevant to theft of services detection in accordance with embodiments described herein, including device data, geographical information system (GIS) data, customer subscriber information, etc. KPI 50 and TSD data 51 are provided to TSD algorithm 40. In various embodiments, pre-equalization coefficients may be used as primary metrics for detecting theft of services, and signal levels may be used as secondary metrics therefor. In various embodiments, the pre-equalization coefficients may be obtained by periodic polling of terminal devices 16, whereas the secondary indicators may be obtained from a full spectrum capture of signals traversing cable network 12 in real time.

In various embodiments, TSD module 24 retrieves KPI 50 from signals traversing cable network 12. The TSD algorithm 40 uses KPI 50 to identify signatures of signals for terminal devices 16 in cable network 12. In an example embodiment, the signature is identified based on pre-equalization coefficients. In some embodiments, signal power levels can be used as a secondary metric for theft detection, for example, to increase accuracy.

Cable television theft, or theft of services, may be defined as the illegal interception of cable programming services without the express authorization of, or payment to, a cable television provider. There are two types of cable theft, passive and active. An example of passive theft is a situation in which a potential customer moves into a home, finds the cable service is on, but does not notify the cable company. Active theft may occur in situations in which a potential customer knowingly and willfully makes an illegal physical connection to the cable system and/or attaches or tampers with equipment to allow the receipt of unauthorized services. Active theft may occur at either a consumer or commercial level. Commercial theft usually happens in an environment where the proprietor receives financial gains from the illegal services (e.g., a bar or a restaurant).

Theft of services may also occur when individuals or companies develop, tamper with, manufacture or otherwise provide equipment enabling unauthorized access to cable services and receive compensation for that equipment. The devices used to receive the unauthorized services are known as descramblers, decoders, black boxes, etc.

An example theft of service may occur, for example, in a situation in which a subscriber purchases a service package from an MSO that includes 4 STBs (each of which has an embedded CM and therefore functions as a DOCSIS device) and a CM and then gives one of the STBs to his neighbor. This enables the neighbor to share the cost of whatever lineup the original purchaser has for a discounted "package" price instead of paying full price to the MSO. It is easy to detect the movement of the STB if it is connected to a completely different CMTS, but difficult to do so if the STB remains in the same service group.

In general, embodiments described herein utilize the fact that a cable network operator possesses a list of the MAC addresses of all of the devices that are supposed to be in the same household and should therefore share a similar "signature" (e.g., pre-equalization coefficient) and show some cross-correlation between certain RF parameters. As described in greater detail hereinbelow, the upstream/downstream power levels within a single household should all be within a similar power envelope. It will be recognized, however, that techniques described herein may utilize other signatures/cross-correlations within the RF domain, including but not limited to frequency offsets, for example.

In one embodiment, TSD module 24 may be used to read equalization, power, and other parameters from the CMTS/CM and match them with a back-office database of devices allocated to a subscriber. This technique is primarily based on the RF channel signature, combined with the input signal power (downstream ("DS") and upstream ("US")), to determine whether two cable modems share the same RF path in the same household.

In one embodiment, the technique includes collecting all of the metrics related to the RF channel signature for each CM/STB. The main metrics include the DS and US pre-equalization coefficients. As noted above, due in large part to the imperfect nature of HFC (e.g., frequency dependent cable loss, reflection, coupling, and interactions among the microreflections), the RF channel will have a frequency dependent channel response, exhibiting peaks and deep valleys on frequencies, resulting in significant receiver performance degradation. A purpose of pre-equalization is to remove the peaks and valleys on the RF channel responses (i.e., to "pre-equalize") so the receivers at the CMTS and cable modems will experience relatively flat channel responses. Pre-equalization is performed by applying the pre-equalization coefficient to the transmitted signals at transmitters.

In theory, the pre-equalization coefficient fully captures the channel response and it is highly dependent on nearly every device and cable in the signal path of the CM/STB. Most likely, each cable modem will have its own unique pre-equalization, but CMs/STBs in the same household will have similar pre-equalization coefficients. CMs/STBs that have the same path loss will may different pre-equalization if they are connected to different taps, as the tap reflections vary drastically from device to device. CMs/STBs connected to the same tap via different ports may have similar pre-equalization if the ports have similar characteristics; however, in reality there is always some performance variation and the drop cables from different ports may differ in length. For example, for a 1 GHz signal, the wavelength is approximately equal to 3 inches in free space, so just one inch difference in length will translate into a 100 degree phase shift.

Cable modems in the same house may exhibit different pre-equalization if they connect with different indoor cables; however, indoor cables are usually relatively short, translating to the taps in pre-equalization with short intervals. Accordingly, an MSO could choose to ignore those taps in pre-equalization coefficients with short intervals to avoid falsely classifying cable modems in the same household as cable modems in different households. A short interval in the time domain translates to a large swing in the frequency domain, so one could look at the frequency response of the pre-equalization coefficient and ignore the changes that span over a large frequency range.

Figure 4:
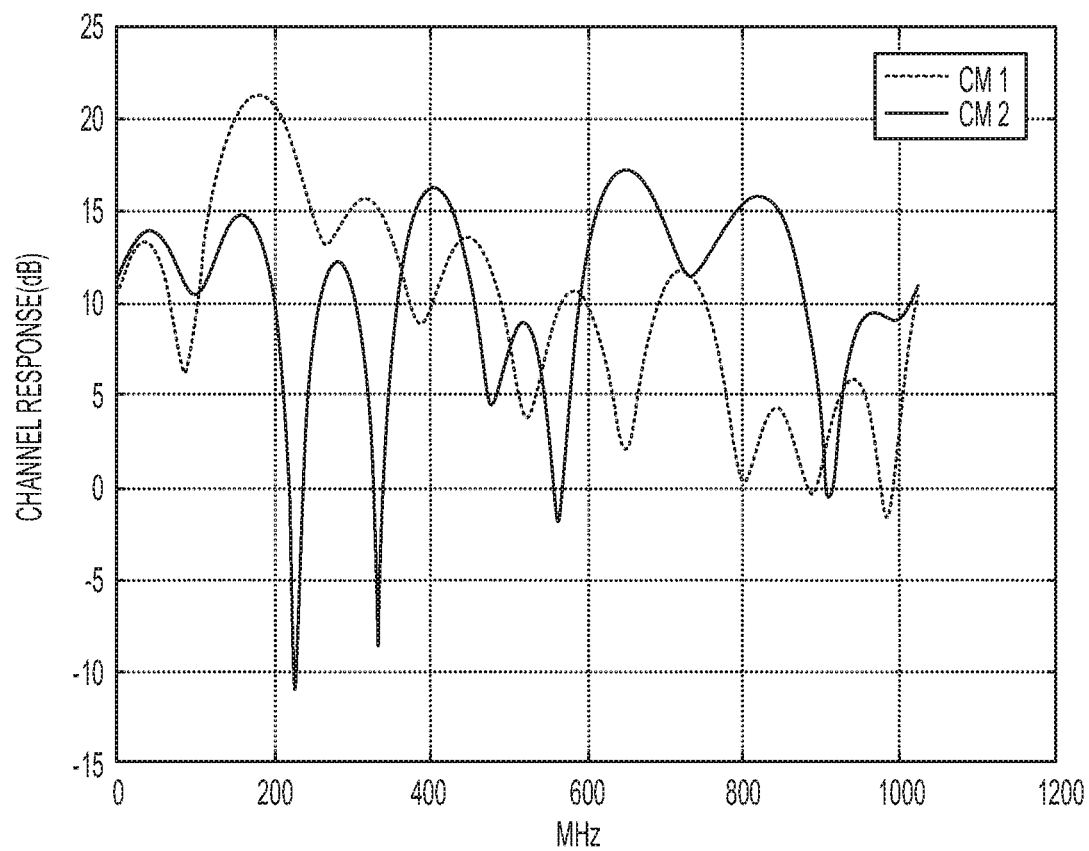
FIG. 4 is a graph illustrating the respective channel responses of two CMs located in different households in accordance with features of embodiments described herein.

Additionally, cable modems in the same household should have similar power levels. If the signal powers (both DS and US) of two cable modems differ significantly (e.g., by 10 dB) then there is a likelihood that the two cable modems are in different households, one close to the outdoor tap and one at the end of the line. Care must be taken when using power as the criteria for determining whether two cable modems are in the same household, as there are many facts that impact power levels and the power levels of two cable modems in the same household may differ considerably. Power level should be used in conjunction with the pre-equalization coefficient to determine whether two cable modems are in the same household. FIG. 4 is a graph illustrating the markedly different channel responses of two CMs located in different households.

Figure 5A:
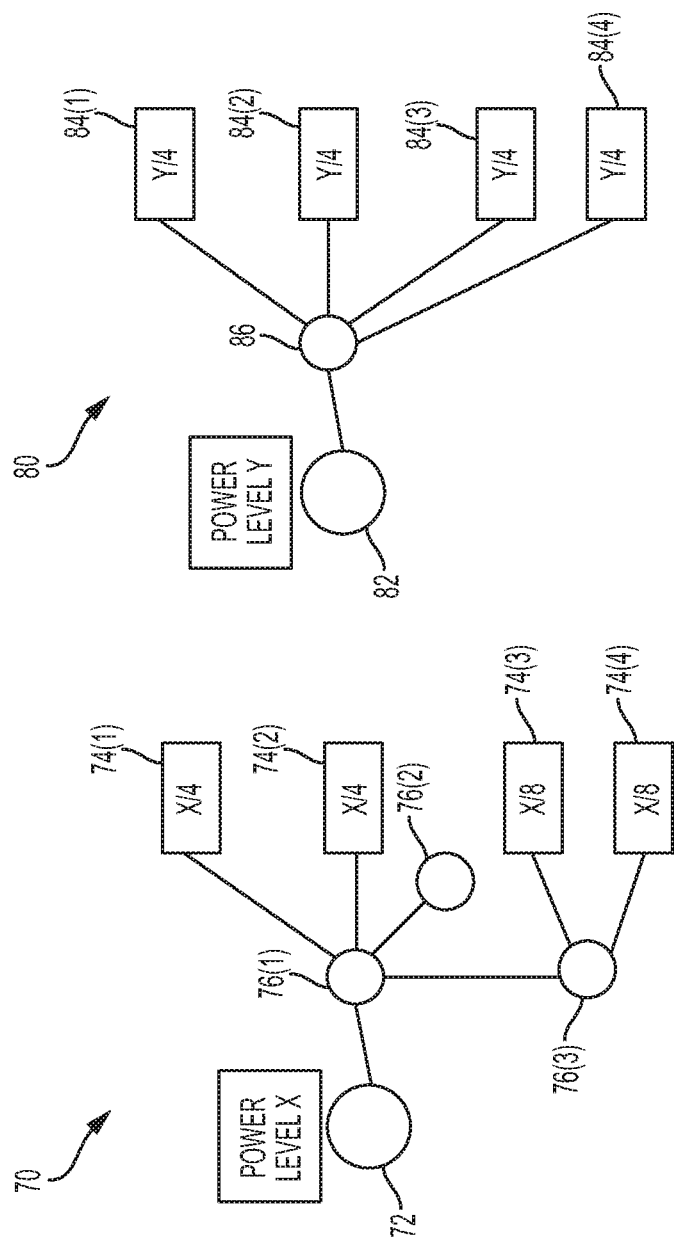
FIGS. 5A and 5B illustrate an effect of moving a CM/STB from one household to another has on overall power level for a combination of CMs/STBs assigned to a subscriber associated with the household.
Figure 5B:
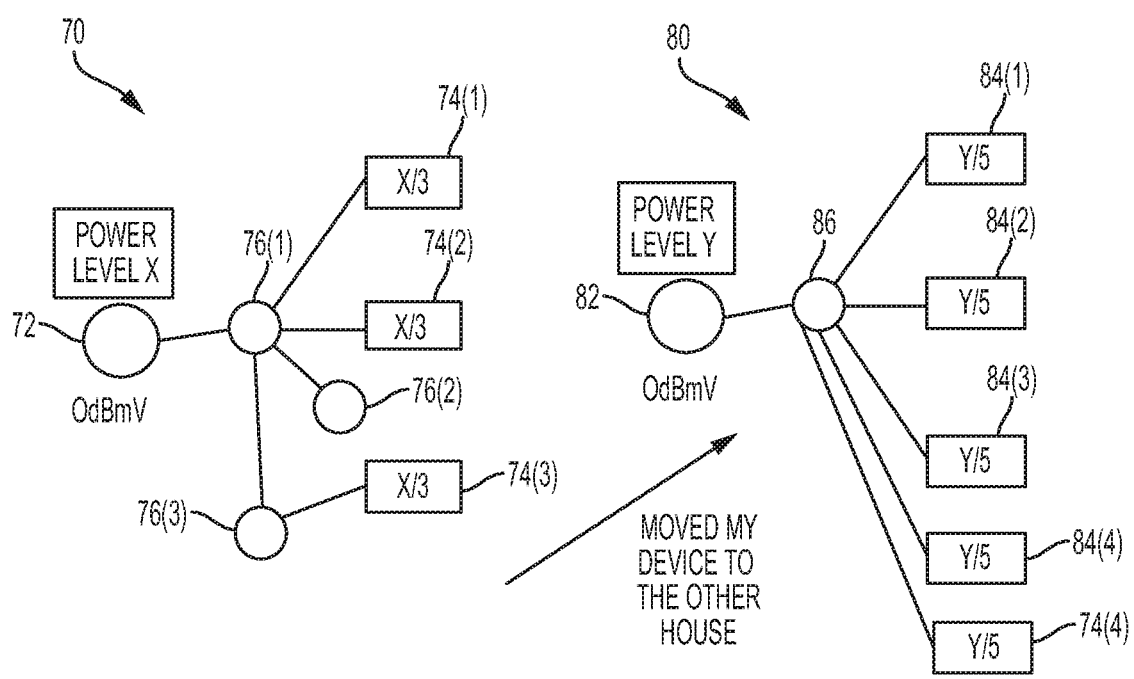

FIGS. 5A and 5B illustrate the effect that moving a CM/STB from one household to another has on the overall power level for the combination of CMs/STBs assigned to a household/subscriber. As shown in FIG. 5A, a first household 70 includes an outdoor tap 72 connected to four CMs/STBs 74(1)-74(4) via home splitters 76(1), 76(2). In particular, CMs/STBs 74(1) and 74(2) are connected to outdoor tap 72 via home splitter 76(1) and CMs/STBs 74(3) and 74(4) are connected to outdoor tap 72 via home splitters 76(1) and 76(2). A third home splitter 76(3) is also connected to the outdoor tap 72 via the home splitter 76(1). As shown in FIG. 5A, a signal level at outdoor tap 72 is X as measured and recorded by a tech at the time of installation of the system. Due to the 4-way splitting at home splitter 76(1), a power level at CMs/STBs 74(1), 74(2) is X/4. Due to the additional 2-way splitting at home splitter 76(2), a power level at CMs/STBs 74(3), 74(4) is X/8. It will be recognized that cable network operator maintains a database in which CMs/STBs 74(1)-74(4) are reflected as being assigned to a first subscriber associated with household 70.

Similarly, a second household 80 includes an outdoor tap 82 connected to four CMs/STBs 84(1)-84(4) via a single home splitter 86. As shown in FIG. 4A, a signal level at outdoor tap 82 is Y as measured and recorded by a tech at the time of installation of the system. Due to the 4-way splitting at home splitter 86, a power level at each of CMs/STBs 84(1)-84(4) is Y/4. It will be recognized that cable network operator maintains a database in which CMs/STBs 74(1)-74(4) are reflected as being assigned to a second subscriber associated with household 80.

Referring now to FIG. 5B, illustrated therein is what occurs when CM/STB 74(4) is moved from household 70 to household 80. In particular, with regard to household 70, because the power level at the outdoor tap 72 remains at X, the removal of a CM/STB from the household 70 results in each of the CMs/STBs 74(1)-74(3) having a power level of X/4 With regard to household 80, because the power level at the outdoor tap 82 remains at Y, the addition of CM/STB 74(4) behind the home splitter 86 results in a (theoretical) 5-way split of the power at the home splitter 86 resulting in a power level Y/5 at each of the CMs/STBs 84(1)-84(4), 74(4).

When the combination of CMs/STBs expected to be at household 70/assigned to the first user (i.e., CMs/STBs 74(1)-74(4)) is examined, actual combined power level of the devices is:

$$X/4+X/4+X/4+Y/5$$

which is different than the expected X/4+X/4+X/8+X/8, as shown in FIG. 5A. Similarly, when the combination of CMs/STBs expected to be at household 80/assigned to the second user (i.e., CMs/STBs 84(1)-84(4)) is examined, the actual combined power level of the devices is:

$$Y/5+Y/5+Y/5+Y/5$$

Which is less than the expected Y/4+Y/4+Y/4+Y/4, as shown in FIG. 5A.

Figure 6:
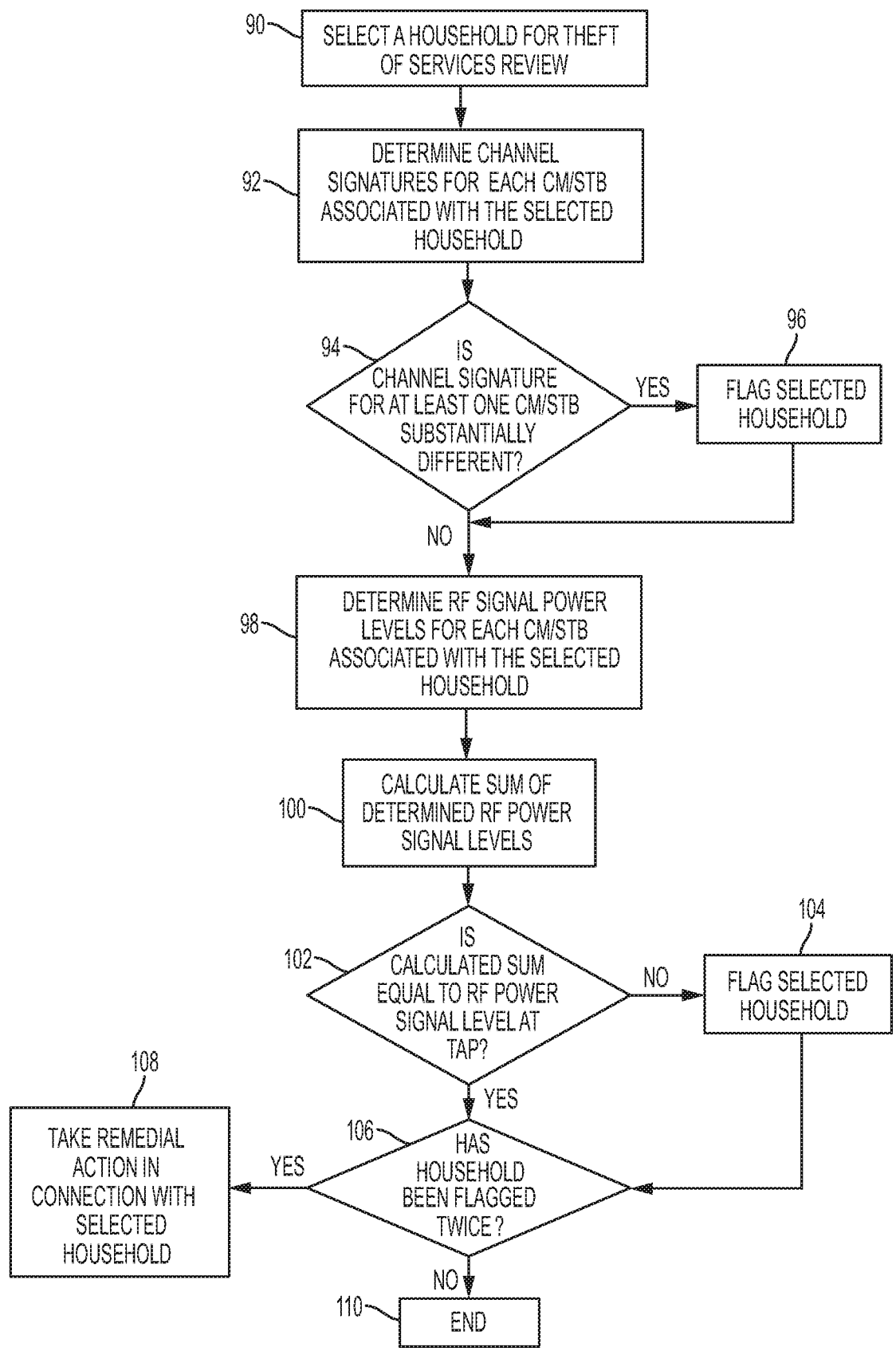
FIG. 6 illustrates a flowchart showing example steps of a technique for detecting the location of a CM/STB using RF channel signature and power level in cable network environments in accordance with embodiments described herein.

FIG. 6 is a flowchart showing example steps of a technique for detecting the relative location of a CM/STB using RF channel signature and power level in cable network environments in accordance with embodiments described herein. In step 90, a household is selected for theft of services review. It will be recognized that the household may be selected in response to a variety of triggers, including for example expiration of a predetermined time period since the last time the household was checked or notification by a third party that the subscriber associated with the household may be participating activities comprising theft of network services. In step 92, channel signatures for all of the CMs/STBs assigned to the selected household/subscriber are determined in a conventional manner. In step 94, a determination is made whether one or more of the CMs/STBs has a substantially different signature than the others. If so, execution proceeds to step 96, in which the selected household is flagged for further review. Execution then proceeds to step 98. If a negative determination is made in step 94, execution proceeds directly to step 98. In step 98, RF signal power levels are determined for each of the CMs/STBs assigned to the household/subscriber. In step 100, a sum of the power levels determined in step 98 is compared to a power level at the outdoor tap of the household measured and recorded at installation. In step 102, a determination is made whether the sum of the power levels is equal to the power level at the outdoor tap of the household measured and recorded at installation. If not, execution proceeds to step 104, in which the household is flagged for further review, and then to step 106. If a positive determination is made in step 102, execution proceeds to step 106. In step 106, a determination is made whether the household has been flagged in either both steps 96 and 104. If so, execution proceeds to step 108, in which remedial action is automatically taken. Such remedial action may include, for example, sending a notification to the subscriber to alert them to potential theft of services, notifying a technician to go to the household to determine whether theft of services has taken place, and cutting off service until a determination can be made whether theft of services has taken place. A report may also be generated. If a negative determination is made in step 106, execution terminates in step 110. It will be recognized that one or more of the steps illustrated in and described with reference to FIG. 6 may be implemented by the TSD module 24.

In certain embodiments, execution may proceed directly from step 96 or step 104 to step 108 if the difference in channel signature for at least one CM/STB above a certain threshold (step 96) or if the difference between the calculated sum and the RF power signal level at the tap is above a certain threshold (step 104), thereby justifying use of only a single one of the metrics rather than requiring use of both of the metrics, as in the embodiment shown in FIG. 6. In other words, if the measurement of a single one of the metrics is significant enough to provide sufficient confidence that theft of service is occurring, only that single metric may be used to justify proceeding directly to remedial action (step 108).

Figure 7:
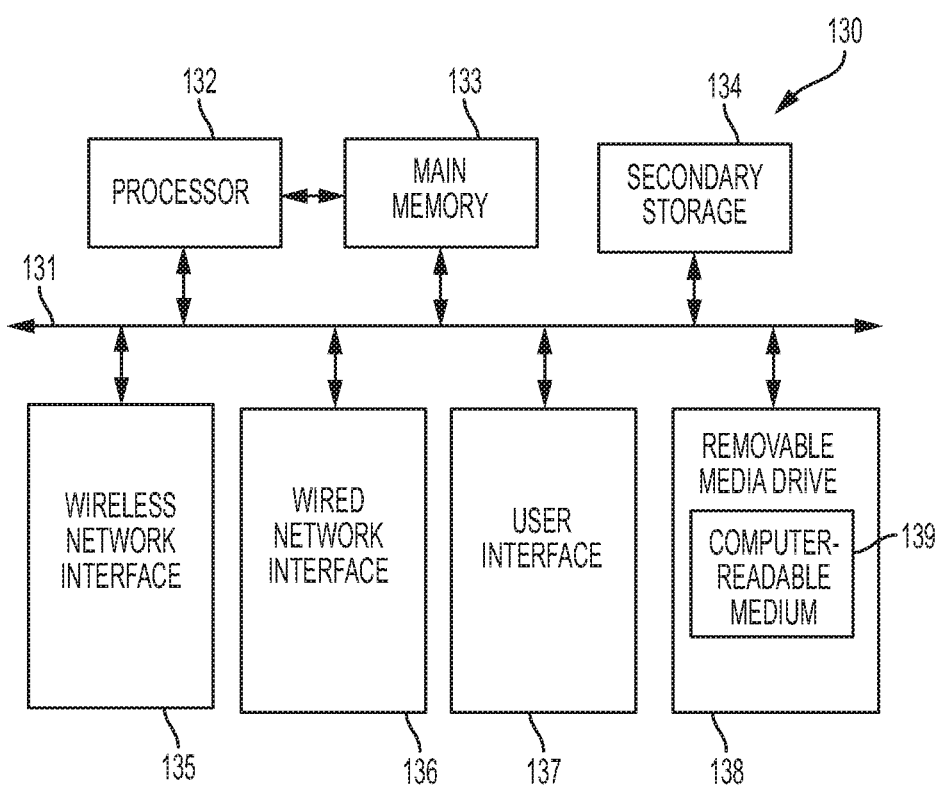
FIG. 7 is a simplified block diagram of a machine comprising an element of a communications network in which techniques for detecting the location of a CM/STB using RF channel signature and power level in cable network environments in accordance with embodiments described herein.

Turning now to FIG. 7, illustrated therein is a simplified block diagram of an example machine (or apparatus) 130, which in certain embodiments may be an SDN node, that may be implemented in embodiments described herein. The example machine 130 corresponds to network elements and computing devices that may be deployed in a communications network, such as an SDN node. In particular, FIG. 7 illustrates a block diagram representation of an example form of a machine within which software and hardware cause machine 130 to perform any one or more of the activities or operations discussed herein. As shown in FIG. 7, machine 130 may include a processor 132, a main memory 133, secondary storage 134, a wireless network interface 135, a wired network interface 136, a user interface 137, and a removable media drive 138 including a computer-readable medium 139. A bus 131, such as a system bus and a memory bus, may provide electronic communication between processor 132 and the memory, drives, interfaces, and other components of machine 130.

Processor 132, which may also be referred to as a central processing unit ("CPU"), can include any general or special-purpose processor capable of executing machine readable instructions and performing operations on data as instructed by the machine-readable instructions. Main memory 133 may be directly accessible to processor 132 for accessing machine instructions and may be in the form of random access memory ("RAM") or any type of dynamic storage (e.g., dynamic random access memory ("DRAM")). Secondary storage 134 can be any non-volatile memory such as a hard disk, which is capable of storing electronic data including executable software files. Externally stored electronic data may be provided to computer 130 through one or more removable media drives 138, which may be configured to receive any type of external media such as compact discs ("CDs"), digital video discs ("DVDs"), flash drives, external hard drives, etc.

Wireless and wired network interfaces 135 and 136 can be provided to enable electronic communication between machine 130 and other machines, or nodes. In one example, wireless network interface 135 could include a wireless network controller ("WNIC") with suitable transmitting and receiving components, such as transceivers, for wirelessly communicating within a network. Wired network interface 136 can enable machine 130 to physically connect to a network by a wire line such as an Ethernet cable. Both wireless and wired network interfaces 135 and 136 may be configured to facilitate communications using suitable communication protocols such as, for example, Internet Protocol Suite ("TCP/IP"). Machine 130 is shown with both wireless and wired network interfaces 135 and 136 for illustrative purposes only. While one or more wireless and hardwire interfaces may be provided in machine 130, or externally connected to machine 130, only one connection option is needed to enable connection of machine 130 to a network.

A user interface 137 may be provided in some machines to allow a user to interact with the machine 130. User interface 137 could include a display device such as a graphical display device (e.g., plasma display panel ("PDP"), a liquid crystal display ("LCD"), a cathode ray tube ("CRT"), etc.). In addition, any appropriate input mechanism may also be included such as a keyboard, a touch screen, a mouse, a trackball, voice recognition, touch pad, etc.

Removable media drive 138 represents a drive configured to receive any type of external computer-readable media (e.g., computer-readable medium 139). Instructions embodying the activities or functions described herein may be stored on one or more external computer-readable media. Additionally, such instructions may also, or alternatively, reside at least partially within a memory element (e.g., in main memory 133 or cache memory of processor 132) of machine 130 during execution, or within a non-volatile memory element (e.g., secondary storage 134) of machine 130. Accordingly, other memory elements of machine 130 also constitute computer-readable media. Thus, "computer-readable medium" is meant to include any medium that is capable of storing instructions for execution by machine 130 that cause the machine to perform any one or more of the activities disclosed herein.

Not shown in FIG. 7 is additional hardware that may be suitably coupled to processor 132 and other components in the form of memory management units ("MMU"), additional symmetric multiprocessing ("SMP") elements, physical memory, peripheral component interconnect ("PCI") bus and corresponding bridges, small computer system interface ("SCSI")/integrated drive electronics ("IDE") elements, etc. Machine 130 may include any additional suitable hardware, software, components, modules, interfaces, or objects that facilitate the operations thereof. This may be inclusive of appropriate algorithms and communication protocols that allow for the effective protection and communication of data. Furthermore, any suitable operating system may also be configured in machine 130 to appropriately manage the operation of the hardware components therein.

The elements, shown and/or described with reference to machine 130, are intended for illustrative purposes and are not meant to imply architectural limitations of machines such as those utilized in accordance with the present disclosure. In addition, each machine may include more or fewer components where appropriate and based on particular needs. As used herein in this Specification, the term "machine" is meant to encompass any computing device or network element such as servers, routers, personal computers, client computers, network appliances, switches, bridges, gateways, processors, load balancers, wireless LAN controllers, firewalls, or any other suitable device, component, element, or object operable to affect or process electronic information in a network environment.

In example implementations, at least some portions of the activities described herein may be implemented in software in. In some embodiments, this software could be received or downloaded from a web server, provided on computer-readable media, or configured by a manufacturer of a particular element in order to implement the embodiments described herein. In some embodiments, one or more of these features may be implemented in hardware, provided external to these elements, or consolidated in any appropriate manner to achieve the intended functionality.

Furthermore, in the embodiments described and illustrated herein, some of the processors and memory elements associated with the various network elements may be removed, or otherwise consolidated such that a single processor and a single memory location are responsible for certain activities. Alternatively, certain processing functions could be separated and separate processors and/or physical machines could implement various functionalities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of the example embodiments, one or more memory elements (e.g., main memory 133, secondary storage 134, computer-readable medium 139) can store data used in implementing embodiments described and illustrated herein. This includes at least some of the memory elements being able to store instructions (e.g., software, logic, code, etc.) that are executed to carry out the activities described in this Specification. A processor can execute any type of instructions associated with the data to achieve the operations detailed herein in this Specification. In one example, one or more processors (e.g., processor 132) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array ("FPGA"), an erasable programmable read only memory ("EPROM"), an electrically erasable programmable read only memory ("EEPROM")), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

Components of communications network described herein may keep information in any suitable type of memory (e.g., random access memory ("RAM"), read-only memory ("ROM"), erasable programmable ROM ("EPROM"), electrically erasable programmable ROM ("EEPROM"), etc.), software, hardware, or in any other suitable component, device, element, or object where appropriate and based on particular needs. Any of the memory items discussed herein should be construed as being encompassed within the broad term "memory element." The information being read, used, tracked, sent, transmitted, communicated, or received by network environment, could be provided in any database, register, queue, table, cache, control list, or other storage structure, all of which can be referenced at any suitable timeframe. Any such storage options may be included within the broad term "memory element" as used herein. Similarly, any of the potential processing elements and modules described in this Specification should be construed as being encompassed within the broad term "processor."

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that topologies illustrated in and described with reference to the accompanying FIGURES (and their teachings) are readily scalable and can accommodate a large number of components, as well as more complicated/sophisticated arrangements and configurations. Accordingly, the examples provided should not limit the scope or inhibit the broad teachings of the illustrated topologies as potentially applied to myriad other architectures.

It is also important to note that the steps in the preceding flow diagrams illustrate only some of the possible signaling scenarios and patterns that may be executed by, or within, communication systems shown in the FIGURES. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication systems shown in the FIGURES in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges, embodiments described herein may be applicable to other architectures.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 142 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method comprising:
    selecting a household;
    identifying each of a plurality of cable devices associated with the selected household;
    determining a channel signature for each of the plurality of cable devices associated with the selected household;
    determining that at least one of channel signatures is substantially different than the remaining ones of channel signatures, wherein determining that the at least one of channel signatures is substantially different comprises:
        determining a radio frequency ("RF") signal power level for each of the plurality of cable devices,
        determining a sum of the RF signal power levels, and
        determining that the sum is equal to an RF power signal level measured at an installation time of the plurality of cable devices; and
    flagging, in response to determining that the sum is not equal to the RF signal power level at the installation time, the selected household for potential theft of services review.

2. The method of claim 1 further comprising, if at least one of the channel signatures is substantially different than the remaining ones of the channel signatures, taking remedial action in connection with the selected household, wherein the remedial action includes at least one of sending notification to a subscriber associated with the selected household, notifying a technician to inspect the selected household, cutting off cable services to the selected household, and generating a report.

3. The method of claim 1 further comprising:
    determining whether the selected household has been flagged at least once; and
    if the selected household has been flagged at least once, taking remedial action in connection with the selected household, wherein the remedial action includes at least one of sending notification to a subscriber associated with the selected household, notifying a technician to inspect the selected household, cutting off cable services to the selected household, and generating a report.

4. The method of claim 1 further comprising:
    determining whether the selected household has been flagged at least twice; and
    if the selected household has been flagged at least twice, taking remedial action in connection with the selected household, wherein the remedial action includes at least one of sending notification to a subscriber associated with the selected household, notifying a technician to inspect the selected household, cutting off cable services to the selected household, and generating a report.

5. The method of claim 1, wherein at least one of the cable devices comprises a cable modem.

6. The method of claim 1, wherein at least one of the cable devices comprises a set top box ("STB").

7. A non-transitory tangible media that includes instructions for execution and when executed by a processor is operable to perform operations comprising:
    selecting a household;
    identifying each of a plurality of cable devices associated with the selected household;

determining a channel signature for each of the plurality of cable devices associated with the selected household;

determining whether at least one of channel signatures is substantially different than the remaining ones of channel signatures, wherein determining that the at least one of channel signatures is substantially different comprises:

determining a radio frequency ("RF") signal power level for each of the plurality of cable devices, determining a sum of the RF signal power levels, and determining that the sum is equal to an RF power signal level measured at an installation time of the plurality of cable devices; and flagging, in response to determining that the sum is not equal to the RF signal power level at the installation time, the selected household for potential theft of services review.

8. The media of claim 7, wherein the operations further comprise:

if at least one of the channel signatures is substantially different than the remaining ones of the channel signatures, taking remedial action in connection with the selected household, wherein the remedial action includes at least one of sending notification to a subscriber associated with the selected household, notifying a technician to inspect the selected household, cutting off cable services to the selected household, and generating a report.

9. The media of claim 8, wherein the operations further comprise:

determining whether the selected household has been flagged at least once; and if the selected household has been flagged at least once, taking remedial action in connection with the selected household, wherein the remedial action includes at least one of sending notification to a subscriber associated with the selected household, notifying a technician to inspect the selected household, cutting off cable services to the selected household, and generating a report.

10. The media of claim 8, wherein the operations further comprise:

determining whether the selected household has been flagged at least twice; and if the selected household has been flagged at least twice, taking remedial action in connection with the selected household, wherein the remedial action includes at least one of sending notification to a subscriber associated with the selected household, notifying a technician to inspect the selected household, cutting off cable services to the selected household, and generating a report.

11. The media of claim 7, wherein at least one of the cable devices comprises a cable modem.

12. The media of claim 7, wherein at least one of the cable devices comprises a set top box ("STB").

13. An apparatus comprising:

a memory element configured to store data; and a processor operable to execute instructions associated with the data;

the apparatus configured for:

selecting a household;

identifying each of a plurality of cable devices associated with the selected household;

determining a channel signature for each of the plurality of cable devices associated with the selected household;

determining whether at least one of channel signatures is substantially different than the remaining ones of channel signatures, wherein determining that the at least one of channel signatures is substantially different comprises:

determining a radio frequency ("RF") signal power level for each of the plurality of cable devices, determining a sum of the RF signal power levels, and determining that the sum is equal to an RF power signal level measured at an installation time of the plurality of cable devices; and flagging, in response to determining that the sum is not equal to the RF signal power level at the installation time, the selected household for potential theft of services review.

14. The apparatus of claim 13 further configured for:

if at least one of the channel signatures is substantially different than the remaining ones of the channel signatures, taking remedial action in connection with the selected household, wherein the remedial action includes at least one of sending notification to a subscriber associated with the selected household, notifying a technician to inspect the selected household, cutting off cable services to the selected household, and generating a report.

15. The apparatus of claim 13 further configured for:

determining whether the selected household has been flagged at least once; and if the selected household has been flagged at least once, taking remedial action in connection with the selected household, wherein the remedial action includes at least one of sending notification to a subscriber associated with the selected household, notifying a technician to inspect the selected household, cutting off cable services to the selected household, and generating a report.

16. The apparatus of claim 13 further configured for:

determining whether the selected household has been flagged at least twice; and if the selected household has been flagged at least twice, taking remedial action in connection with the selected household, wherein the remedial action includes at least one of sending notification to a subscriber associated with the selected household, notifying a technician to inspect the selected household, cutting off cable services to the selected household, and generating a report.

17. The apparatus of claim 13, wherein at least one of the cable devices comprises at least one of a cable modem and a set top box ("STB").

18. The apparatus of claim 13, wherein at least one of the cable devices comprises a cable modem.

19. The apparatus of claim 13, wherein the RF signal power level is measured at a tap of the selected household.

* * * * *